United States Patent [19]
Burroughs

[11] 3,735,452
[45] May 29, 1973

[54] RELEASABLE HOOK MEANS FOR SECURING LOG LOADS

[76] Inventor: Elvin O. Burroughs, Route 2, Box 204, Dexter, Oreg. 97431

[22] Filed: Feb. 28, 1972

[21] Appl. No.: 229,973

[52] U.S. Cl..................24/68 CD, 24/233, 254/78
[51] Int. Cl................................................A44b 13/02
[58] Field of Search...............24/68 T, 68 CT, 68 TT, 24/68 R, 68 CD, 233, 241 CH, 241 P, 241 R, 230.5 CR, 230.5 S, 230.5 SA, 230.5 R, 241 S, 241 WB, 236, 233; 248/361 A; 280/179 A; 254/78; 59/85, 89, 93

[56] References Cited
UNITED STATES PATENTS

| | | | |
|---|---|---|---|
| 495,237 | 4/1893 | Wilson | 24/233 |
| 607,499 | 7/1898 | Wisse | 24/233 X |
| 887,110 | 5/1908 | Miller | 24/68 TT UX |
| 2,513,256 | 6/1950 | Sonnenburg | 24/230.5 S |
| 2,821,003 | 1/1958 | Boyes et al. | 280/179 A UX |
| 2,919,895 | 1/1960 | Johnson | 254/78 |

FOREIGN PATENTS OR APPLICATIONS

| | | | |
|---|---|---|---|
| 7,937 | 4/1896 | Great Britain | 24/233 |

*Primary Examiner*—Donald A. Griffin
*Attorney*—James D. Givan, Jr.

[57] ABSTRACT

Hook means for use in conjunction with an over-center locking device for securing a cable or chain cincture about a load or raft of logs. A main body portion of the hook means swingably carries a hook element which is engageable at its outer end with a chain length or looped cable end. When in a closed, cincture engaging position the outer end of said hook occupies a recess formed within said body portion. Additionally, an appendage on the body portion restricts movement of the cable or chain end during hook opening movement to permit the hook to be swung open from a remote position away from an unstable log load.

3 Claims, 6 Drawing Figures

PATENTED MAY 29 1973
3,735,452
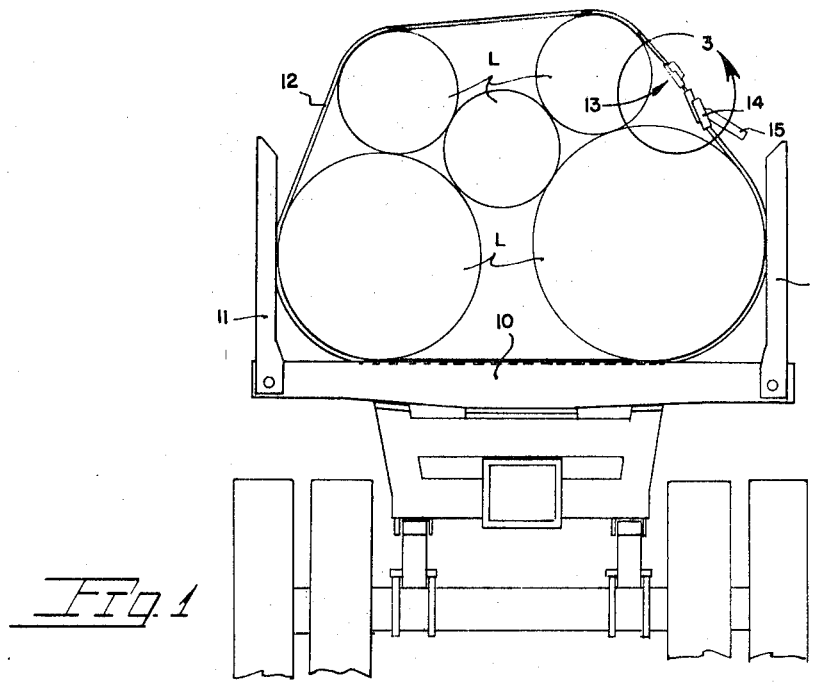
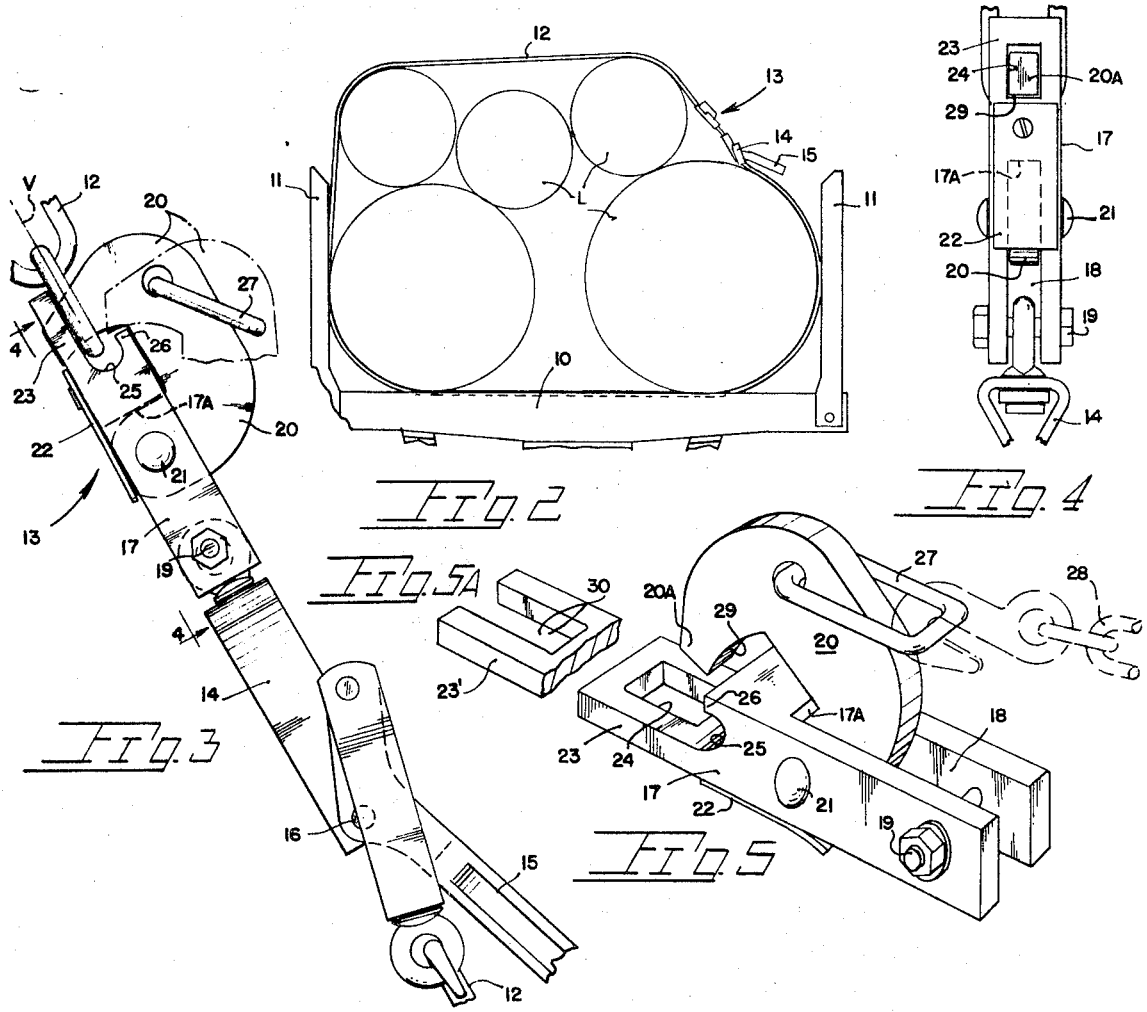

RELEASABLE HOOK MEANS FOR SECURING LOG LOADS

BACKGROUND OF THE INVENTION

The present invention relates generally to equipment for securing groups of logs into piled configuration for convenient movement of the logs. The logs secured by the present invention may be a load on a log truck and trailer or assembled into a log bundle or raft for movement on a body of water. Conventionally, log loads are confined by a plurality of cables holding the logs together along with over-center type locks being applied to cinch the load. The present hook means is usable both with such locks or simply to secure the end segments of a cable or chain cincture about floating log bundles.

When transporting logs by truck many, if not all, states require the logs be confined by cables or chains encompassing the entire load at intervals therealong. Such securement serves, in most instances, to prevent log shifting while underway. A log load is further confined, of course, by the truck and trailers upright bunk stakes. At an unloading site the cables or chains are removed from about the bundled log load prior to discharge of the logs.

The loading of logs for travel to the discharge site requires a degree of skill in that, obviously, the logs so loaded should constitute a stable load not susceptible to shifting movement relative to one another during transit. The random diameters of the logs, along with their relatively smooth cylindrical exteriors, complicates the forming of a stable log load and requires the use of a plurality of separate cinctures as above noted. Each cincture is independently applied and released in a like manner. During transit of log loads it is not uncommon for a log or logs to shift causing added tensioning of the cable or chain cincture. As overcenter type locks are used to connect the cable (or chain) ends, the manual unlocking of same becomes very difficult and in some instances necessitates the arduous disassembly of the over-center binder or lock for removal of the cincture. As the shifting of a log or logs of a log load requires immediate remedial action, the truck operator is limited to the roadside use of hand tools normally carried on the truck. Further, a substantial risk is incurred from displaced logs rolling from the pile against or over a log truck bunk stake.

In the rafting of logs similar cables or chains, of greater length, are used for consolidating the logs. Log shifting or swelling action by reason of water absorbtion can cause post-tensioning of the encircling cables or chains to complicate cincture removal.

SUMMARY OF THE PRESENT INVENTION

The present invention concerns a releasable hook means for use in combination with an over-center locking device of the type used, among other things, to secure log loads or log rafts. The release mechanism embodies a hook which may be remotely actuated in cases of shifting logs without risk of injury and without the disassembly of lock components.

The present hook means includes a swingably mounted hook of unique configuration for engagement with a chain link or looped cable end. Release of same may be in the normal manner wherein the over-center lock is first actuated to provide slack in the cable or chain or, oppositely, release can be achieved without slack as in cases where a load shift has occurred. The hook provides a cam-like surface which coacts with the cable or chain end to retain same in a closed position. Normally, release of the over-center lock provides enough slack for easy separation of the hook and cable end. In cases where such release cannot be achieved the hook is released safely from a remote location. Log movement subsequent to the latter in no way constitutes a risk as would be encountered upon the usually necessary disassembly of the over-center locking device.

BRIEF DESCRIPTION OF THE DRAWINGS

In the accompanying drawings,

FIG. 1 is a rear elevational view of a loaded log truck trailer with a cable cincture thereabout and connected at its ends by the present hook means in combination with an over-center locking device, FIG. 2 is a view similar to FIG. 1 but showing a log load after shifting has occurred from the FIG. 1 load configuration, FIG. 3 is an enlarged view of the present hook means encircled at 3 in FIG. 1, FIG. 4 is a view of the underside of the present hook means taken along line 4—4 of FIG. 3, FIG. 5 is a perspective view of the present hook means removed from the over-center lock and showing a release pull attached, and FIG. 5A is a perspective view of a modified end portion of the body of the present hook means.

DESCRIPTION OF THE PREFERRED EMBODIMENTS

With continuing reference to the accompanying drawings wherein applied reference numerals indicate parts similarly identified in the following specification the reference numeral 10 indicates the log bunk of a log truck trailer on which the log load is supported. Bunk stakes at 11 confine at least the lowermost logs L in place on the bunk. Typically load discharge will be by the downward positioning of a pivoted bunk stake for rolling discharge of the logs or more recently by lifting of the log load by special log lifting equipment.

A typical log load includes smaller diameter logs loaded into place to comprise a stable load as seen in FIG. 1. Depending on the log diameters and log placement the load may or may not have the stability desired. As earlier noted, the application of chain or cable cinctures, independent of the truck and trailer, is common and usually mandatory by governmental regulation. Cable or chain lengths at 12 are commonly utilized and are adapted to encompass various sized loads by reason of adjustable segments for engagement with the conventional over-center type locks.

With attention now to the present invention, the same is indicated generally at 13 shown in combination with a conventional over-center type lock generally at 14. The lock 14 is meant to be typical of various well-known types used in connection with the securement of log loads. Essentially such locks include an operating handle 15, which upon upward movement from its FIG. 3 position will cause relaxing of the chain or cable length 12 by counter clockwise passage of pivot means at 16 approximately 180 degrees whereupon slack is provided for normal manual uncoupling of the chain length 12.

Returning to the attachment 13, embodying the present invention, the same includes a main body member 17 in attachment with lock 14. Body member 17 is bifurcated at 18 to closely receive a hook 20 pivotally mounted to the body by pivot pin 21 which may be in the form of a riveted member. Also bridging the bifurcation 18 is a bolt member 19 for reception of one end of the over-center lock 17 or alternatively a link or looped cable end of cincture 12. Abutting hook 20, when in a closed position, is an internal wall 17A abutting one edge of said hook. The pivoted end of hook 20 is in bearing contact with a spring plate 22 affixed to the bottom of the body 17 and assisting to hold said hook both in its open and closed positions.

A reduced crossectional portion or section at 23 of body 17 provides a link (or cable end) engaging surface which is apertured at 24 to receive the distal end 20A of hook 20. Body member 17 is transversely grooved at 25 to enhance link or cable end engagement and particularly to provide a lip 26 to wipe the link or cable end free of the hook end 20A during unhooking. To facilitate unhooking in cases where the chain or cable cincture has been post-tensioned subsequent to locking of the over-center lock, I provide means at 27 for convenient coupling of release means 28 in FIG. 5. The unseen end of release 28 terminates at a point remote from the log load to permit tripping of the present hook attachment from a safe distance should a log or logs move upon release of the cincture.

The hook 20 is provided with a cincture engaging edge 29 which normally, in a hook closed position, will engage a link or looped cable end of cincture 12. Edge 29 is inclined relative to a force vector V representing the tension load of the attachment or, as shown, may be of slightly curved shape to prevent hook movement once the fastened end of the cincture is under tension. The area defined by groove 25 is such as to permit reception of common sizes of cincture ends which may range up to approximately one-half inch in diameter for the uses above noted.

A modified form of the present hook means includes a bifurcated end 23' as seen in FIG. 5A with an open area 30. The modified form enables somewhat less costly fabrication of body member 17 and is of suitable strength for most all applications of the present device.

The operation of the hook means is believed apparent from the foregoing description wherein functional aspects of the hook means have been set forth along with the structural description of same.

While I have shown but a few embodiments of the invention it will be apparent to those skilled in the art that the invention may be embodied still otherwise without departing from the spirit and scope of the invention.

Having thus described the invention what is desired to be secured under a Letters Patent is :

1. Releasable hook means for use in combination with a length of cable or chain cincture extending about a grouping of logs, the cincture may include additional over-center locking means, the hook means comprising, — a main elongated body portion of reduced section at one of its ends to thereat receive a chain link or looped cable end of the cincture, said reduced section defining an open area, said body portion including a lip projecting at least partially over said reduced section and partially over a link or cable end thereon to restrict movement of same during opening of the hook means, — a hook swingably mounted within said body portion and having its distal end engageable, when in a closed position, with the chain link or looped cable end of the cincture passing about the load, said distal end occupying the open area in said body portion when the hook is closed, said hook having an inner edge surface engageable with the link or cable end and thereat inclined to a load vector so as to cause the hook to be biased to a closed position at all times a tension load is exerted on said cable or chain, and — means associated with the distal end of said hook for the temporary attachment of a length of release line whereby the hook may be opened from a location remote from the grouped logs.

2. Releasable hook means as claimed in claim 1 wherein said hook edge surface is in close proximity to said lip for travel therepast causing the latter to wipe the chain link or looped cable end from the hook during opening movement of the hook.

3. Releasable hook means as claimed in claim 2 wherein said body portion is bifurcated at the other of its ends to pivotally mount said hook and the remaining end of the cincture or overcenter locking means associated therewith.

* * * * *